Figure 1:
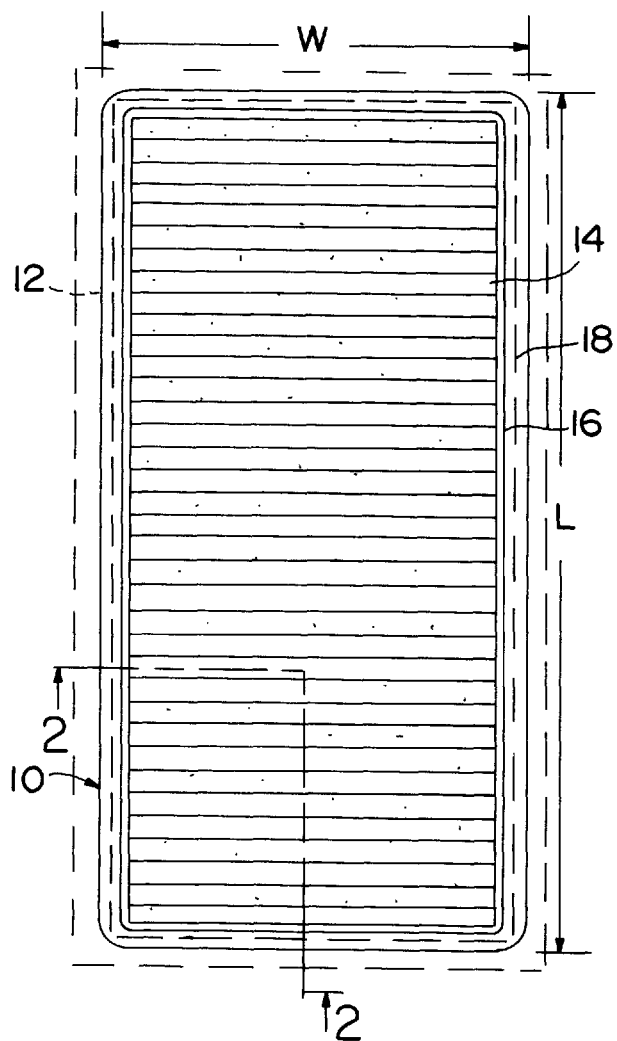

United States Patent [19]
Wong et al.

[11] Patent Number: 5,853,445
[45] Date of Patent: Dec. 29, 1998

[54] INTERLOCKING DUAL FILTER

[75] Inventors: Johnny H. Wong, Gastonia; Gregory Keith Rhyne, Denver; Demetrios Tsengouras, Gastonia, all of N.C.

[73] Assignee: Dana Corporation, Toledo, Ohio

[21] Appl. No.: 906,906

[22] Filed: Aug. 6, 1997

[51] Int. Cl.$^6$ .................................................. B01D 46/12
[52] U.S. Cl. ............................... 55/343; 55/484; 55/485; 55/502
[58] Field of Search ............................ 55/343, 484, 485, 55/486, 502

[56] References Cited

U.S. PATENT DOCUMENTS

| | | |
|---|---|---|
| 2,334,802 | 11/1943 | Zuckermann . |
| 3,186,149 | 6/1965 | Ayers ......................................... 55/484 |
| 3,386,580 | 6/1968 | Grabarczyk . |
| 3,864,109 | 2/1975 | Hansen . |
| 4,105,422 | 8/1978 | Kiguchi ...................................... 55/484 |
| 4,264,344 | 4/1981 | Ludecke et al. ........................... 55/484 |
| 4,419,113 | 12/1983 | Smith . |
| 4,684,381 | 8/1987 | Wasylyniuk ............................... 55/484 |
| 4,743,280 | 5/1988 | Pappas ....................................... 55/484 |
| 4,828,590 | 5/1989 | Eckstein et al. .......................... 55/484 |
| 4,861,359 | 8/1989 | Tettman ..................................... 55/484 |
| 4,865,636 | 9/1989 | Raber ........................................ 55/484 |
| 5,290,344 | 3/1994 | Onodera .................................... 55/484 |
| 5,429,742 | 7/1995 | Gutman et al. . |

*Primary Examiner*—Jay H. Woo
*Assistant Examiner*—Minh-Chau T. Pham
*Attorney, Agent, or Firm*—Millen, White, Zelano & Branigan, P.C.

[57] ABSTRACT

An interlocking dual filter includes a first filter element having a filter media enclosed by a frame and a sealing gasket disposed around the frame. The frame of the first filter element has a depending flange which defines a space for receiving a second filter element having a different filter media. The flange includes a plurality of recesses which form a first latching arrangement. The first recesses are aligned with latching tabs which extend laterally from the frame of the second filter element so that when the second filter element is placed within the frame, the second filter element latches with the first filter element. In accordance with one embodiment, the filter media of the first and second filter elements are different so that the filter assembly may be customized to accommodate various air stream conditions and utilizations.

11 Claims, 3 Drawing Sheets

INTERLOCKING DUAL FILTER

FIELD OF THE INVENTION

The present invention relates to air filters, and more particularly, the present invention relates to air filters which have more than one filtering element.

BACKGROUND OF THE INVENTION

Air filters are used almost universally for internal combustion engines powering automotive vehicles and land based equipment where airborne dust occurs. The amount and type of dust varies from one geographical location to another, so that air filters which may be effective in one location are not necessarily as effective in another location.

Air filters are also increasingly used for many applications other than internal combustion engines to filter from air streams particulate matter such as dust, pollen, mold spores, carbon particles, microorganisms and many other forms of particulate matter as well as odor-causing agents. Filtering needs differ from one location to another and differ at different areas of the world. Accordingly, there is a need to customize filter media according to the contaminants being removed.

With air filters for any purpose, some contaminants are trapped by different filter materials and may clog those materials prior to other materials being clogged. In addition, there is a need to be able to customize the filter configurations according to customer orders.

Historically, in order to combine filter media of different types, media were co-pleated with one another. Co-pleating causes increased restriction which interrupts air flow. In addition, the capacity and efficiency of a filter may be reduced because one filter media cannot be conveniently separated from another. As knowledge accumulates as to the natures of particulate contaminants in environmental air, filter media specifically configured to trap selected particles are increasingly available. Accordingly, there needs to be a more flexible arrangement for configuring air filters so as to take advantage of this knowledge.

SUMMARY OF THE INVENTION

It is a feature of the present invention to provide new and improved air filter assemblies, wherein a plurality of filter elements are provided to achieve flexibility so that the filter of a selected geometric size and shape may have customized characteristics.

In view of this feature and other features, the present invention is directed to an air filter assembly comprising a first filter element and second filter element, wherein the filter elements have upstream and downstream sides and include first and second filter media, respectively, which are mounted in first and second filter frames, respectively. The first filter frame has a first latching arrangement on its downstream side and the second filter element has a second latching arrangement on its upstream side for coupling with the first latching arrangement on the downstream side of the first filter. A peripheral seal for sealing with a housing is arranged around only the first filter element.

In accordance with a further aspect of the invention, the first and second filter elements have selected sizes and shapes. Wherein the shapes are the same and the size of the first filter element is slightly larger than that of the second filter element.

In accordance with another aspect of the invention, the first latching arrangement on the downstream side of the first filter element comprises a projecting flange having lacking apertures, while the second latching arrangement on the upstream side of the second filter element comprises latching tabs for receipt in the latching apertures.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein:

FIG. 1 is a front face view of a filter of the type utilizing the principles of the present invention;

FIG. 2 is an end view, partially in section, taken along lines 2—2 of FIG. 1, showing a filter assembly in accordance with the present invention;

FIG. 3 is an exploded end view, partially in section, showing first and second filter elements comprising the filter assembly of FIG. 2;

FIG. 4 is an end view, partially in section, of a second embodiment of the invention, also taken along lines 2—2 of FIG. 1; and FIG. 5 is an exploded end view, partially in section, of the filter elements shown in FIG. 4.

DETAILED DESCRIPTION

Referring now to FIG. 1, there is shown a filter assembly 10 configured in accordance with the principles of the present invention, wherein the filter assembly 10 has a specific shape and specific dimensions in order to fit within a specific housing 12. The specific housing 12 is shown in dotted lines and can accept filter assemblies 10 of various characteristics. In order to fit within or to cover the opening of the housing 12, the filter assembly 10 is rectangular with a specific width (w) and a specific length. The housing 12 may, for example, be a housing in the air intake of an internal combustion engine (not shown).

Generally, the filter assembly 10 comprises a rectangular filter media 14, a relatively stiff rectangular frame 16 made of plastic and a rectangular gasket 18 to seal with the housing 12.

Referring now to FIG. 2, it is seen that the filter assembly 10 is comprised of a first filter element 20 and a second filter element 22. The first filter element 20 has the top view of FIG. 1, because it completely covers the second filter element 22. Together, the filters 20 and 22 remove particulate material from an airstream 23 which first impacts an upstream face 25 of the first filter element 20, exits from a downstream face 26 of the first filter element, enters through the upstream face 27 of the second filter element 22, and exits the filter element 22 through downstream face 28. The second filter element 22 has a width and length less than that of the first filter element, but also has a rectangular shape. The gasket 18 around the frame 16 is only mounted on the first filter element 20, the second filter element 22 being gasketless and relying on the gasket 18 for sealing purposes.

Referring now to FIG. 3, it is seen that the first filter element 20 and second filter element 22 are separable so that different combinations of filter elements may be used for different environments. The frame 16 of the first filter element has a dependent flange or skirt 34 which forms an enclosure 35 that surrounds the juncture of the first and second filter elements 20 and 22 so that air flows substantially only from the first filter element through the second filter element. The flange or skirt 34 has a plurality of apertures 36 disposed in spaced relation therearound which form female components of a first latching arrangement. The second filter element 22 is received within the enclosure 35 and has a plurality of outwardly extending projections or tabs 37 which are aligned with the apertures 36 in the flange or skirt 34 of the first filter element 20 to provide a male latching arrangement. When the second filter element 22 is nested within the space 35, the projections or tabs 37 couple or latch the elements 20 and 22 together to form the filter assembly 10, the gasket 18 on the first filter assembly 20 sealing both filter elements with respect to the housing 12 (shown in dotted lines in FIG. 1).

The second filter element 22 has a filter media 38 which preferably has different characteristics from the filter media 14 of the first filter element 20. The specific characteristics of the filter media 38 depend on the condition of the air which is being filtered and the use to which the air is put. For example, the filter media 38 might be the primary filter media and the filter media 14 of the first filter element 20 could be a prefilter. Both the filter media 14 and the filter media 38 could be pleated cellulose or synthetic material, or the filter media 14 could be a mat of non-pleated filter media, such as spun-bonded polyester. There are a number of combinations which can be accomplished by configuring the assembly 10 in different ways.

Between the first filter element 20 and the second filter element 22, there is a space 40. The space 40 is available for a thin air treating material which may be, for example, a sheet or thin panel 42 (shown in dotted lines in FIG. 3) of activated carbon for removing odoriferous compounds or substances from the air stream 23.

Figure 4:
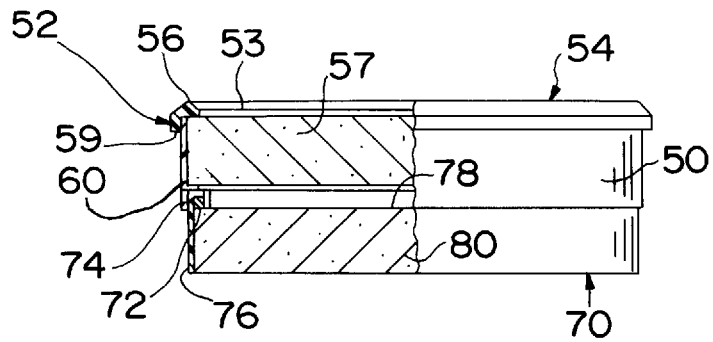
Figure 5:
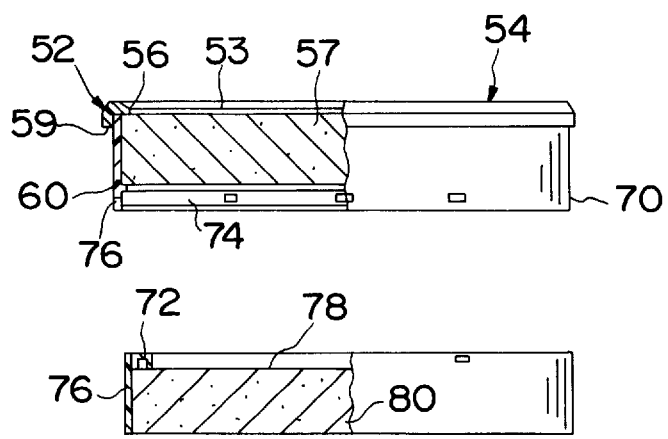

Referring now to FIG. 4, there is shown a second embodiment of the assembly, wherein the filter assembly is designated by the numeral 50 and includes a polyurethane gasket 52 which is disposed at the upstream face 53 of a first filter element 54. The polyurethane gasket 52 is used to seal the assembly 50 with the housing 12 (FIG. 1) and has a lip 56 which overlies the upstream face 53 of a first filter media 57. A depending peripheral portion 59 of the gasket 52 overlies the outside surface of a frame 60 of hard plastic that surrounds the filter media 57.

Figure 2:
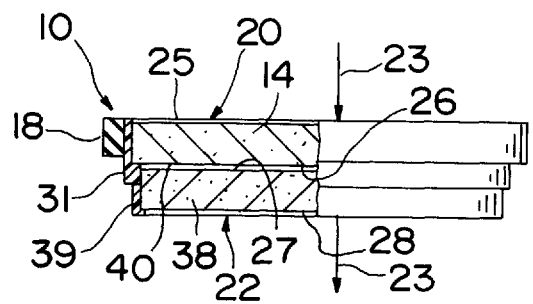
Figure 3:
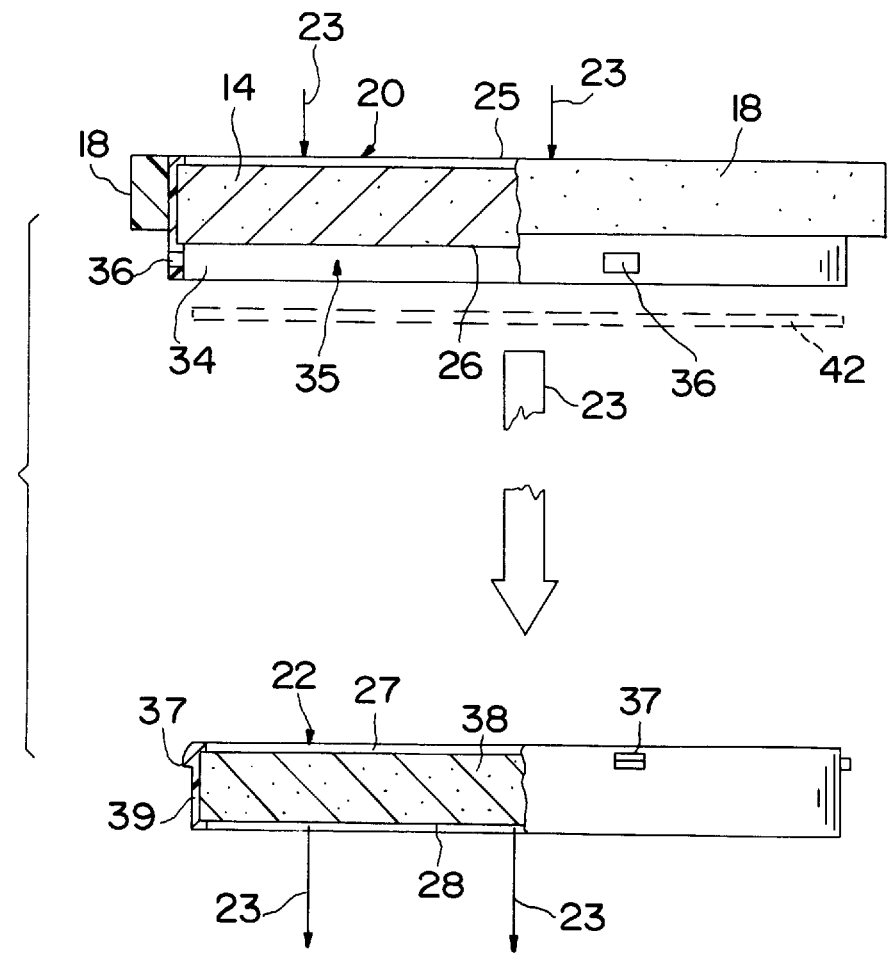

The second filter element 70 is substantially similar to the second filter element 22 of FIGS. 1–3, but includes a polyurethane seal 72 which is received within a channel 74 formed in a frame 76 adjacent the upstream face 78 of a second filter media 80. The polyurethane seal 52 around the first filter element 54 prevents air from bypassing the second filter media 80 of the second filter element 70. As with the first embodiment of the invention, it is preferable that the frames 60 and 76 of the second embodiment be formed by injection molding.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. An air filter assembly for mounting in a housing, wherein the air filter assembly comprises:

a first filter element panel for filtering particles, the first filter element panel having an upstream side and a downstream side and including a first filter media mounted in a first filter frame, the first filter frame having a first latching arrangement proximate a downstream side thereof;

a second filter element panel for filtering particles, the second filter element panel having an upstream side and a downstream side and including a second filter media mounted in a second filter frame, the second filter frame having a second latching arrangement at an upstream side thereof for coupling with the first latching arrangement on the downstream side of the first filter, and a peripheral flange around the juncture of the first and second filter element wherein the air is constrained to flow substantially only from the first filter element through the second filter element.

2. The air filter assembly of claim 1, further including a peripheral seal for sealing with the housing, the peripheral seal being arranged around only the first filter element.

3. The air filter assembly of claim 2, wherein at least one of the filter media is a pleated filter media.

4. The filter arrangement of claim 3, wherein one of the filter media is a mat of non-pleated fiber material and the second filter media is a pleated cellulose filter media.

5. The filter assembly of claim 1, wherein the first filter media and second filter media are both pleated filter media made of cellulose or synthetic material.

6. The air filter assembly of claim 1, wherein there is a space between the downstream side of the first filter element and upstream side of the second filter element and wherein a relatively thin sheet of air treatment material is disposed in the space.

7. The air filter assembly of claim 6, wherein the relatively thin sheet of material comprises activated carbon.

8. The air filter assembly of claim 1, wherein the first latching arrangement comprises a skirt defining an enclosure proximate the downstream side of the first filter element, the skirt having a shape corresponding to the shape of the second filter element and including a plurality of spaced apertures therein and the second latching arrangement comprising a plurality of projecting tabs on the frame of the second latching element, the tabs being received in the apertures in the skirt to latch the second filter element to the first filter element so as to configure the assembly.

9. The filter assembly of claim 8, wherein the first and second filter elements have selected sizes and shapes, wherein the shapes are the same and the size of the first filter element is slightly larger than the size of the second filter element, wherein the second filter element is received within the enclosure of the first filter element.

10. The air filter assembly of claim 8, wherein the second filter element includes a sealing gasket disposed around the periphery of the upstream face thereof for sealing with the downstream face of the first filter element.

11. The filter assembly of claim 1, wherein the first and second frames are injection molded from plastic material.

* * * * *